(12) United States Patent
Hunter

(10) Patent No.: US 10,491,891 B2
(45) Date of Patent: Nov. 26, 2019

(54) RE-IMAGED SWEPT VOLUME DISPLAY WITH MULTI-PETAL GEOMETRY

(71) Applicant: Intel Corporation, Santa Clara, CA (US)

(72) Inventor: Seth E. Hunter, Santa Clara, CA (US)

(73) Assignee: INTEL CORPORATION, Santa Clara, CA (US)

(*) Notice: Subject to any disclaimer, the term of this patent is extended or adjusted under 35 U.S.C. 154(b) by 152 days.

(21) Appl. No.: 15/278,713

(22) Filed: Sep. 28, 2016

(65) Prior Publication Data
US 2018/0091804 A1    Mar. 29, 2018

(51) Int. Cl.
| | | |
|---|---|---|
| H04N 13/388 | (2018.01) | |
| H04N 13/393 | (2018.01) | |
| H04N 13/398 | (2018.01) | |
| G02B 27/22 | (2018.01) | |

(52) U.S. Cl.
CPC ....... H04N 13/393 (2018.05); G02B 27/2285 (2013.01); G02B 27/2292 (2013.01); H04N 13/398 (2018.05); *H04N 2213/001* (2013.01)

(58) Field of Classification Search
CPC ............ G02B 27/2285; G02B 27/2292; G02B 27/225; G03B 21/28
See application file for complete search history.

(56) References Cited

U.S. PATENT DOCUMENTS

| | | | | |
|---|---|---|---|---|
| 2005/0062684 A1* | 3/2005 | Geng | .................... | G06F 3/0346 345/32 |
| 2012/0098941 A1* | 4/2012 | Joseph | ............... | G02B 27/2221 348/51 |
| 2015/0062700 A1* | 3/2015 | Otsubo | ................... | G03B 35/24 359/479 |
| 2015/0193084 A1* | 7/2015 | Juni | ....................... | G03B 21/00 345/175 |
| 2015/0241712 A1* | 8/2015 | Smithwick | ......... | G02B 27/2292 353/7 |
| 2016/0062221 A1* | 3/2016 | Matsubara | ......... | G03B 21/2013 353/31 |
| 2017/0269372 A1* | 9/2017 | Moisant-Thompson | .................... | G03B 21/62 |

\* cited by examiner

*Primary Examiner* — Christina A Riddle
*Assistant Examiner* — Christopher A Lamb, II
(74) *Attorney, Agent, or Firm* — Womble Bond Dickinson (US) LLP

(57) ABSTRACT

A display system and method for using the same are disclosed. In one embodiment, the display system comprises a swept volume display operable to produce a displayed swept volume and a re-imaging glass to re-image the displayed swept volume that appears on a first side of the re-imaging glass to a second side of the re-imaging glass.

22 Claims, 7 Drawing Sheets

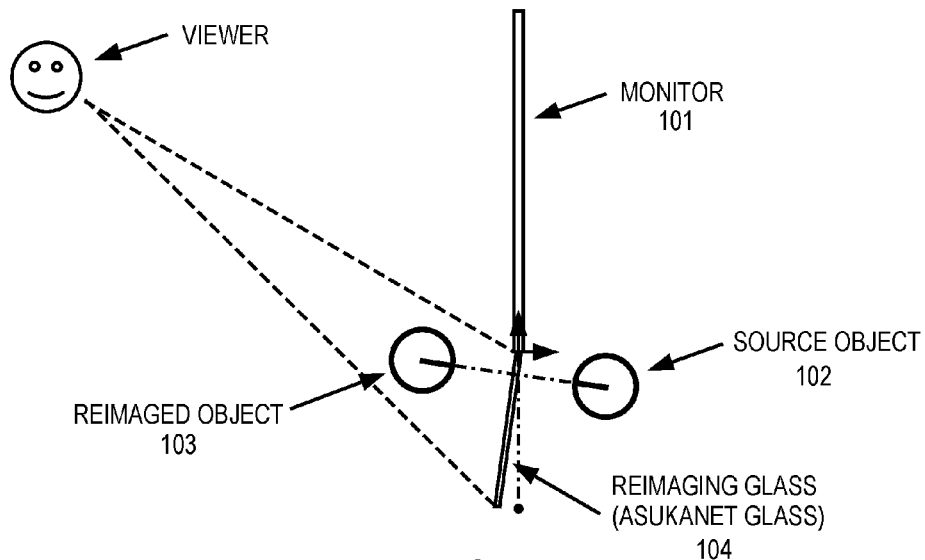
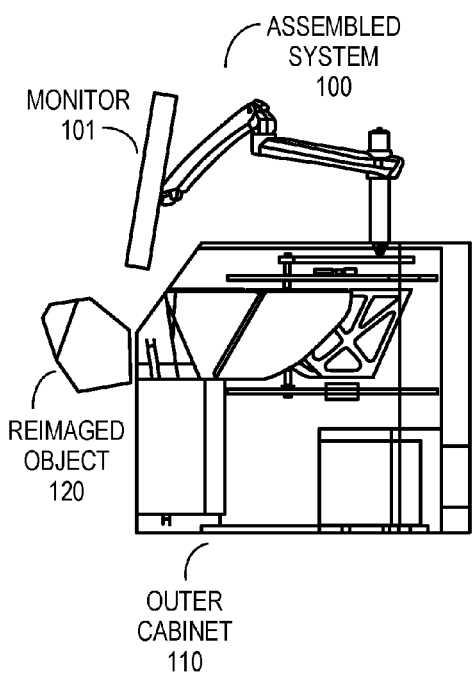
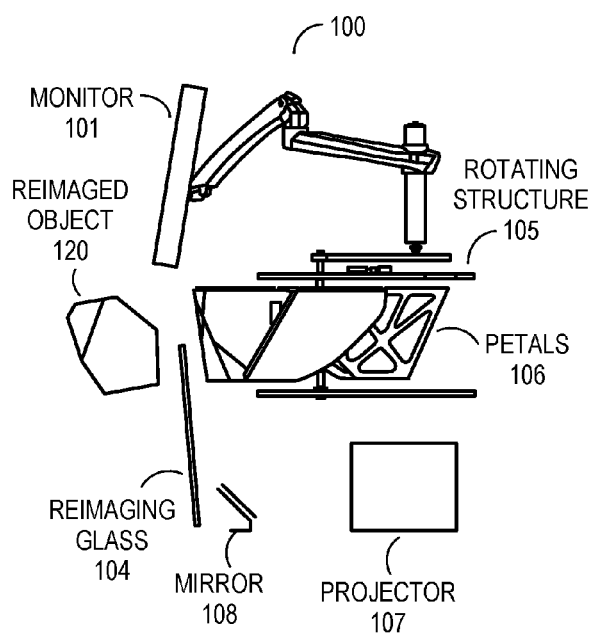

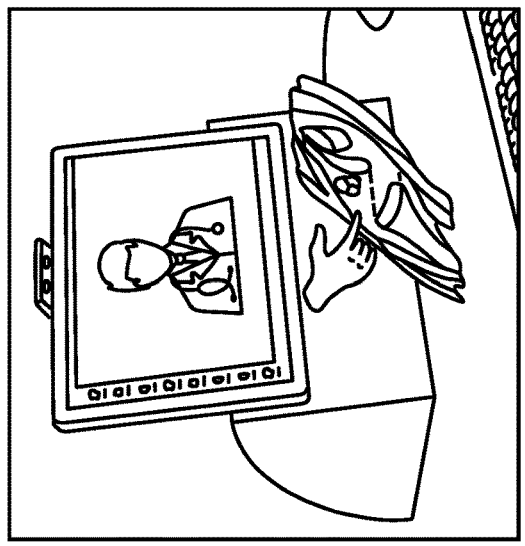
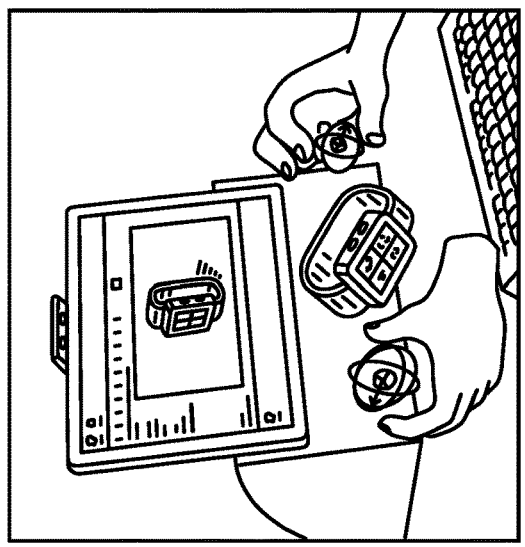
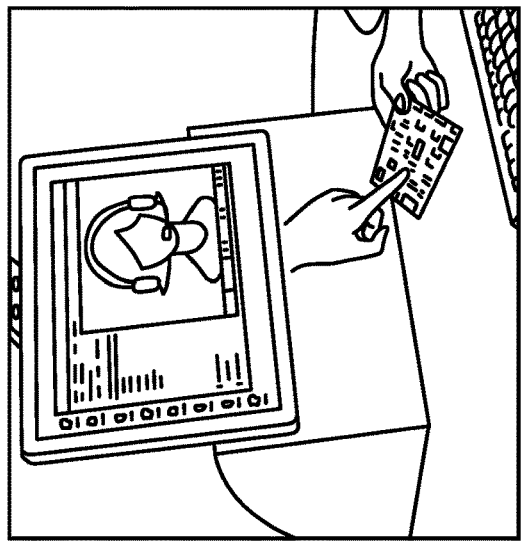
FIG. 8

RE-IMAGED SWEPT VOLUME DISPLAY WITH MULTI-PETAL GEOMETRY

FIELD OF THE INVENTION

Embodiments of the present invention relate to the field of displays for computing systems; more particularly, embodiments of the present invention relate to swept volume displays that use a rotating structure having multiple petals to create three-dimensional (3D) volumes that may be viewed from multiple sides.

BACKGROUND OF THE INVENTION

One type of three-dimensional (3D) displays, referred to herein as volumetric displays, has seen recent advancements. The types of displays in this class include holographic displays, swept volume displays and static volume displays. Volumetric displays allow for three-dimensional (3D) graphical scenes to be displayed within a true 3D volume. In other words, a volumetric display is not a projection of volumetric data onto a 2D display but a true physical 3D volume. Volumetric displays based on a swept-volume technique operate by reciprocating motion (rotation or translation) of a surface in order to blend multiple spatial images into a single perceived volume.

While the volumetric displays allow a user to view different parts of a true 3D scene, the act of viewing the different parts typically requires that the user physically move around (or over) the display or that the display be moved or rotated in front of the user.

Asukanet Company of Japan has developed a display technology that produces aerial images. This technology may be used to display objects as free-floating still or moving images. This is accomplished using a multi layered glass plate with micro-mirror arrays embedded in the layers which has the unique property of reimaging light within a limited field of view. That is, an image of any object can be formed at the same distance on the other side of the plate as the object is from the plate. For purposes herein, this is referred to as reimaging light. In this case, the image is seen in mid-air in the same manner as if the light had been emitted by an actual object.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates a basic principle of the reimaging glass.

FIG. 2 is a side view of one embodiment of a volumetric display system with a reimaged volume.

FIG. 3 is another view of the volumetric display system of FIG. 2 depicting the inner assembly of the volumetric display system.

FIG. 8 illustrates example applications showing real and virtual objects overlapping and artist's renderings of possible interaction techniques.

DETAILED DESCRIPTION OF THE PRESENT INVENTION

Figure 4:
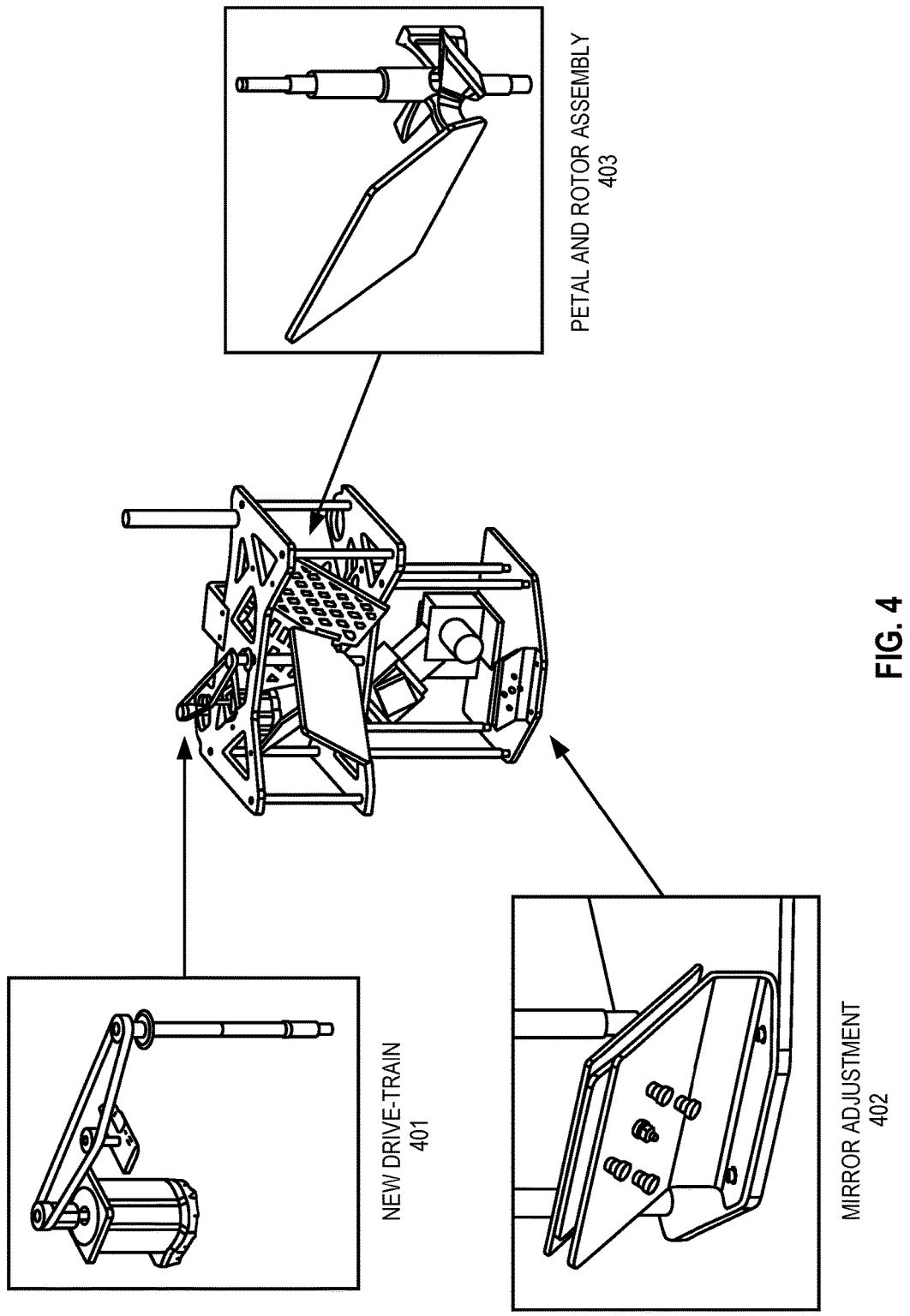
FIG. 4 is another view of the internal components of a volumetric display system.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

In one embodiment, a volumetric display is disclosed that creates the illusion of a true three-dimensional (3D) hologram viewable from different angles without requiring glasses or a head mounted apparatus. By using a geometry designed for the properties of optical re-imaging glass, such as, for example, the aerial imaging glass made by Asukanet, the display system is able to create a volume that can be perceived from different angles and appears in free space so that users can reach into the image space and interact with portions of the image volume. That is, the volumetric display creates a floating rendered object that can be touched mid-air and viewed within a range of angles, thereby allowing users to touch and interact with the objects as if they were physically available. In one embodiment, this is accomplished using a multi-petal rotating geometry with reimaging glass to produce a volumetric aerial image which, in turn, produces a 3D display volume that is re-imaged in front of the display. This "mid-air image" allows the user to reach their hands into the volume supporting direct interactions which were not previously possible.

In one embodiment, a goal of the reimaging display is to provide an experience of a true 3D aerial image that can be viewed from different angles and supports mid-air interactions. In one embodiment, the multi-petal rotating geometry includes four petals, and by spinning four petals at 45 degrees behind the reimaging glass and projecting images on to the petals using a high speed projector a 3D volume is generated. The volume is positioned optimally behind the display to be reimaged out in front so that it appears as if it is floating out in front of the display. This creates the "illusion" of a hologram—a compelling and desirable experience from any applications that require rendering and manipulating 3D representations of content.

FIG. 1 illustrates a basic principle of the reimaging glass. Referring to FIG. 1, a monitor 101 of a display system is shown positioned above reimaging glass 104 (e.g., aerial imaging glass from Asukanet. In one embodiment, Asukanet's aerial imaging glass is designed to bend light rays that are incident on the glass surface to create an illusion of floating objects. In one embodiment, by rotating petals in a rotating structure (not shown), a swept volume display generates a projected image referred to as source object 102, as a result of projecting an image that is reflected by a 45 degree mirror (not shown) under the petals. The reimaging glass 104 causes a reimaged object 103 corresponding to source object 102 to be displayed on the opposite side of reimaging glass 104 from source object 102. Thus, the projected image volume is reflected from one side of reimaging glass 104 to the other.

The optics of re-imaging glass 104 (e.g., Asukanet aerial imaging glass) allow it to behave as a 3-dimensional mirror by transforming light from behind re-imaging glass 104 into the foreground in front of it. Through this transformation, in one embodiment, reimaged objects appear the same size at the equal perpendicular distance from re-imaging glass 104 (the shortest path between the object and the glass), however the reimaged volume is inverted. That is, due to the inversion of the object, the reimaged object appears as an inside-out shell of the source object. This inversion places features of the object that are furthest away from behind re-imaging glass 104, in a position that is closest to re-imaging glass 104 for the reimaged object. Note that only light refracted from the visible area of the object becomes reimaged.

Based on the ray trace between light from the source object to re-imaging glass 104, the size of re-imaging glass 104 dictates the viewable angles from which the reimage object can be seen. In one embodiment, the viewing range of the reimaged object is defined by the intersecting light rays between the original object, re-imaging glass 104, and the viewer. In one embodiment, the "field of view" in which one sees the re-imaged object is 45 degrees on center—so 22.5 degrees left and right movement. As long as the viewer is within the fold of the glass perspective, the object will be viewable with parallax, which is the phenomena that occurs when one fixates on an object and moves left and right and the object appears to stay fixed in space.

Thus, with the use of the reimaging glass, a virtual or reimaged volume is created at the same size and distance in front of re-imaging glass 104 as the source object is behind re-imaging glass 104.

In an alternative embodiment, re-imaging glass 104 is replaced with a dihedral corner reflector array.

FIG. 2 is a side view of one embodiment of a volumetric display system with a reimaged volume. In one embodiment, the volumetric display system combines a high-frame rate projection system, a synchronization scheme, and a swept volume geometry to create three-dimensional floating volumes.

Referring to FIG. 2, assembled volumetric display system 100 includes monitor 101 coupled to an outer cabinet 110. Outer cabinet 110 acts as a shield to mitigate the amount of ambient light that entered the assembly by shielding the rotating structure from direct external light. In one embodiment, outer cabinet 110 contains a frame that houses re-imaging glass 104 (e.g., Asukanet aerial imaging glass) on hinges. Using the rotating geometry of petals contained in outer cabinet 110, volumetric display system 100 generates a reimaged object 120 using re-imaging glass 104.

FIG. 3 is another view of volumetric display system 100 of FIG. 2 depicting the inner assembly of the volumetric display system. The inner assembly includes a motion assembly. In one embodiment, the motion assembly includes a motor, a driver train, a petal assembly, a projector, and a mirror.

Referring to FIG. 3, with the outer cabinet 110 removed, volumetric display system 100 includes a rotating structure (geometry) 105 coupled to rotate petals 106 using a drive mechanism. In one embodiment, petals 106 includes 2, 3, 4, . . . etc. petals.

Volumetric display system 100 also includes a projector 107 to project light in the form of images (e.g., pre-sliced images) toward mirror 108. In one embodiment, projector 107 operates as a modular light source to allow for development with a high brightness green LED source, as well as a mixable RGB (Red, Green, and Blue) light source and optics assembly.

Figure 5:
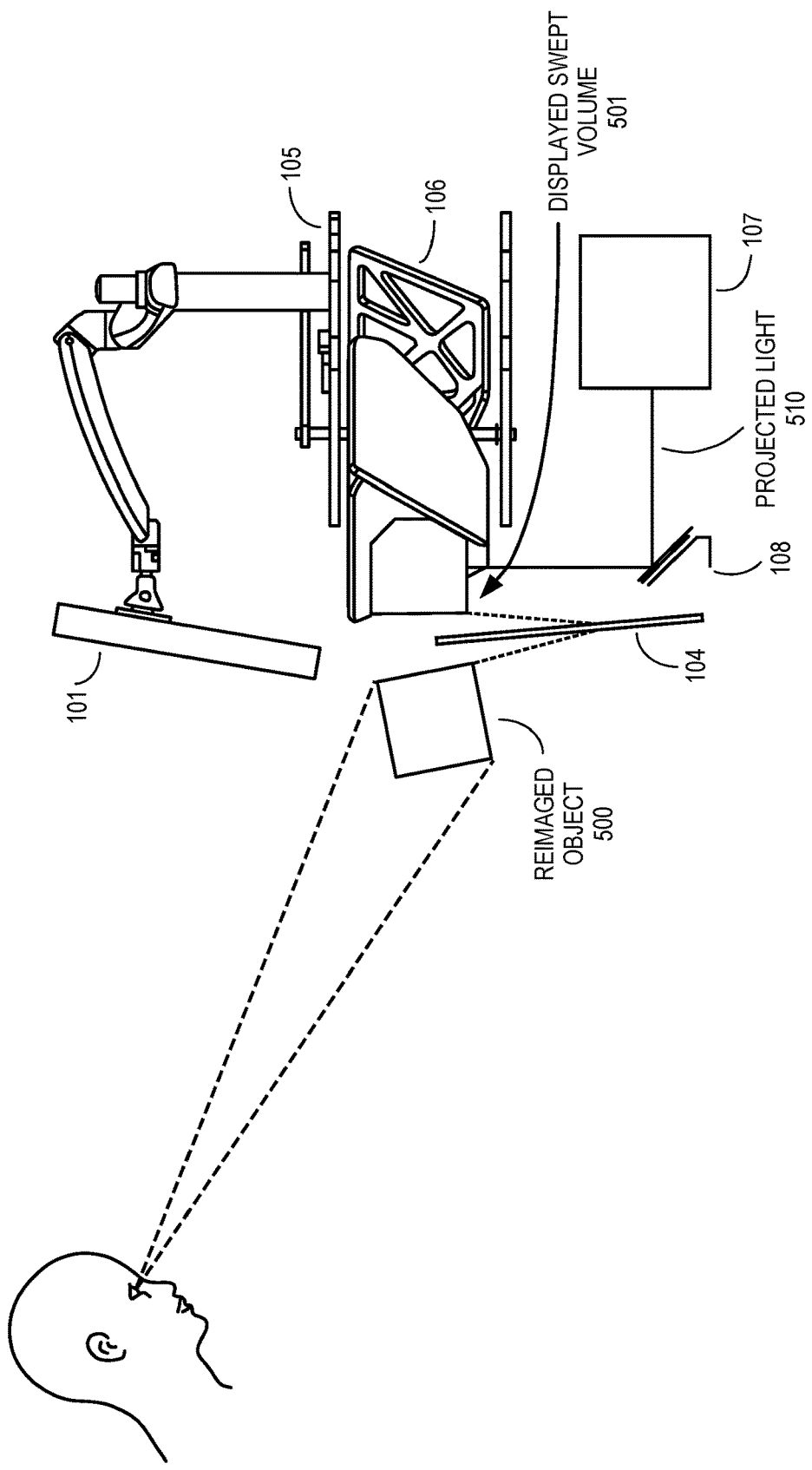
FIG. 5 illustrates a further view of the volumetric display system.

Mirror 108 reflects the projected light from projector 107 up towards petals 106. In this manner, when petals 106 are rotating, a source object (e.g., displayed swept volume 501 of FIG. 5) is generated by petals 106 on one side of reimaging glass 104, which is reimaged by reimaging glass 104 as reimagined object 120 on the other side of reimaging glass 104 from the source object.

In one embodiment, the actual rendered volume, the source object, is defined by the swept volume as intersected with the projection cone of the light projected from projector 107. In one embodiment, the geometry of the swept volume is specifically designed for reimaging by positioning it at a 45 degree angle behind the reimaging glass 104 to achieve an improved, and potentially best, depth of field, focus with a maximized field of view of the virtual 3D volume. Rotating structure 105 allows the optimal area that is reimaged by the glass at the correct angle to be swept to preserve light rays along the X and Y axis. In one embodiment, volumetric display system 100 displays a 3D image with the re-imaging glass with full parallax and no glasses are required to view the 3D image.

FIG. 4 is another view of the internal components of volumetric display system 100. Referring to FIG. 4, a drive train 401 is a drive mechanism to rotate rotating structure, causing petals 104 to rotate. In another embodiment, the rotation speed is 550 RPM for monochromatic mode.

In one embodiment, to perceive color without flicker, when, for example, 16 to 64 colors are in the scene, either three DMDs are required or the petals need to spin at ~1000 RPM. This could be achieved by increasing the number of petals (but this would decrease the volume size) or by using a higher torque motor, which would make the display very noisy.

In one embodiment, the drive mechanism comprises a timing belt driver train system that rotates petals 104. This significantly reduces the noise created by driving the system.

Mirror adjustment mechanism 402 is a mechanical mechanism to adjust mirror 108 to ensure projected light from projector 107 is projected toward petals 104. In one embodiment, the mechanism is a plate with 4 set screws in a diamond shape from the center of the mirror, and adjusting the set screws allows the mirror angle to be adjusted in a 5 degree range up and down, left and right so the initial angle of the projection on the petals can be corrected before software calibration.

Petal and rotor assembly 403 illustrates one embodiment of a coupling of one of petals 104 of rotating structure 105. In one embodiment, petals 104 are made of aluminum and are combined with a thermal fit to a shaft. The petals may be made of other materials. In one embodiment, a CNC rotor mount is used.

In one embodiment, the structure of the petals is designed to reduce the weight. On one side, they are flat and painted with a projection paint, while on the other side material has been removed in a distributed grid fashion to reduce the torque required to spin the petals, which are made of rigid metal. In one embodiment, the size of the petal is 295 mm×260 mm, which is enough surface area to support a 15 cm×15 cm×15 cm volume at all slice angles.

In one embodiment, projector projects an image that is a virtual model that is sliced into 256 slices per petal. These images of the virtual model are loaded on to a memory (e.g., random access memory (RAM)) on a Vialux 7001 field programmable gate array (FPGA) and are triggered for projection by projector 107 toward petals 104 by the rotation of petals 104 that are connected to a rotary encoder. A synchronization subsystem relays a pulse train to the internal triggers on the Vialux board that controls the digital micromirror device (DMD) and light output by projector 107. In one embodiment, a personal computer board (PCB) with a XMOS processor relays the encoder values of where the petal is to the Vialux board to tell it to render the next frame in the sequence, and to help calibrate the slices to the rotation of the petals. In one embodiment, this board also sends pulses to the LED controllers that pulse the light output to the projector.

The final swept volume generated by projector 107 projecting light onto petals 104 is reimaged by reimaging glass 104 (e.g., a plate of glass manufactured by Asukanet which consists of two layers of orthogonal micromirrors 0.75 mm apart). The final image appears to float in front of reimaging glass 104 at the same distance as the real volume is rendered on petals 104.

In one embodiment, the pairing of monitor 101 with a volumetric display specifically designed to reimage a swept volume in free space.

While the volumetric display uses a high speed projector and mirrors and projects pre-sliced images onto a rotating volume with the correct timing to produce the illusion of persistent 3D content to a viewer, there are a number of advantageous features of the volumetric display system 100. For example, in one embodiment, the planar geometry of rotating structure 105 with petals 106 comprises four petals configured 45 degrees away from the viewer with light (e.g., pre-sliced images) being projected onto petals 104 from underneath. This unique geometry is designed to maximize the amount of light that is reimaged by positioning the volume behind and above the midpoint of reimaging glass 104 to avoid a conflict between the real image (displayed swept volume 501 of FIG. 5) and the virtual image (reimaged object 500 of FIG. 5) being in the same field of view. It also eliminates dead zones and elongation issues that were part of previous swept volume systems by utilizing a flat-plane in place of a helix and placing the content in front of the rotational axis. Another advantage of the four petal arrangement is the fact that the volumetric refreshes can be quadrupled without increasing the rotation speed being used to rotate the petals.

In one embodiment, projector 107 is an optics projector with a working distance of 45 cm and a depth of field of 15 cm. In one embodiment, this is accomplished by using a condenser lens and an integration rod that collimates the light to allow the entire volume to be in focus. In one embodiment, projector has a controller (e.g., printed circuit board) that links a rotary encoder to an internal trigger based on the current rotational angle of the spinning petals 104.

In one embodiment, the display system generates a reduced amount of mechanical noise in comparison to prior art displays. That is, the display is considerably quieter than previous systems due to the four petal design and construction of the petals from a single block of metal. In on embodiment, the display system sounds about as loud as a fan on a desktop tower. The four petal design allows the speed to be reduced to 10 rotations per second while keeping the volume refresh rate at 40 Hz.

Figure 6:
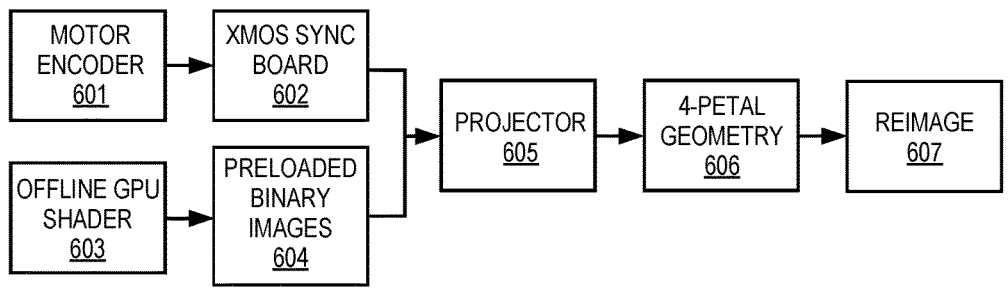
FIG. 6 is a block diagram of one embodiment of a swept volume system architecture of the display system.

FIG. 6 is a block diagram of one embodiment of a swept volume system architecture of the display system. Referring to FIG. 6, motor encoder 601 sends optical encoder signals to the XMOS synchronization (sync) board 602. The optical encoder signals are used to trigger the projection of images. Sync board 602 translates the encoder signals into a sequence/timing signal that is used to instruct the projector as to when to display the next image. In one embodiment, sync board 602 also determines whether the projector should send a red, blue or green image.

The images that are projected by the projector are generated by graphics processing unit (GPU) shader 603, which generates binary images that are stored in a memory as pre-loaded binary images 604. In one embodiment, GPU shader 603 generates 256 image slices that are projected in sequence by the projector.

In another embodiment, the models from which the images are generated are first loaded into the system using an Assimp library to import the model into a series of meshes. Once loaded, these meshes are rendered in shader 603 that slices the model based on the sweep of a virtual petal. In one embodiment, the slices are stored in memory 604 and then streamed or pushed over universal serial bus (USB) 3.0 to the projector.

In one embodiment, images are loaded into projector (605) and projected onto the 4-petal geometry (606) to create a projected image volume. The projected image volume is reimaged by the reimaging glass to create the reimage (607).

Figure 7:
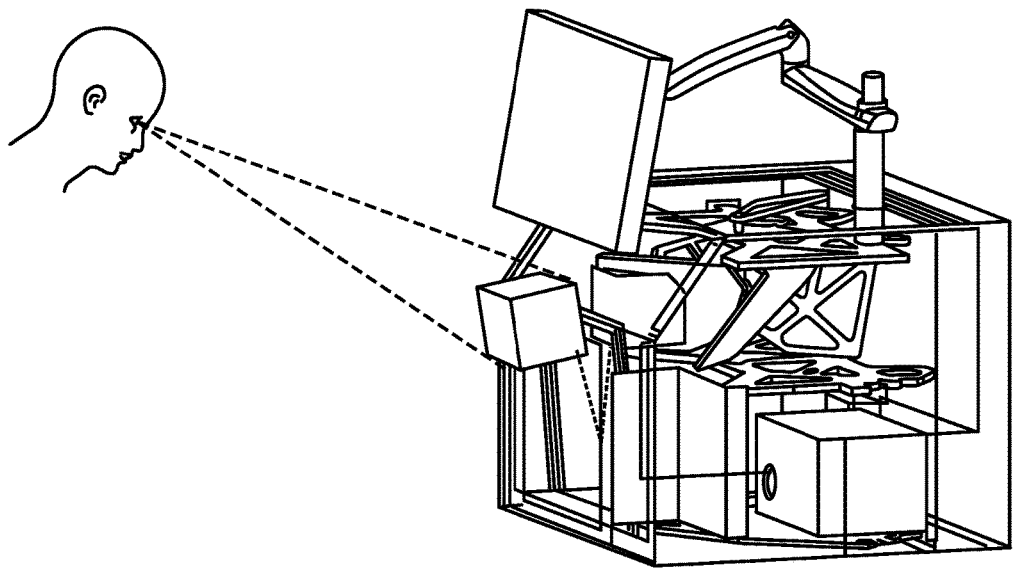
FIG. 7 illustrates another view of the display system enclosure to show the overall form factor of the system.

FIG. 7 illustrates another view of the display system enclosure to show the overall form factor of the system.

FIG. 8 illustrates example applications showing real and virtual objects overlapping and artist's renderings of possible interaction techniques.

As set forth above, the display system is a desktop 3D system that merges two-dimensional (2D) and 3D displays. The position of the re-imaging glass relative to the viewer allows the 3D display to compliment content on a 2D touch monitor above the 3D content. This allows for prototyping scenarios that complement existing applications such as computer aided design (CAD) modeling, teleconferencing, and public kiosks that would benefit from auxiliary 3D content.

Furthermore, the display system described herein extends the display capabilities of 2D reimaging systems by adding a 3D volumetric swept volume system. One purpose of the system is to display a reimaged light volume at a sufficient frame rate to create the illusion of a hologram in front of a desktop personal computer system.

Figure 9:
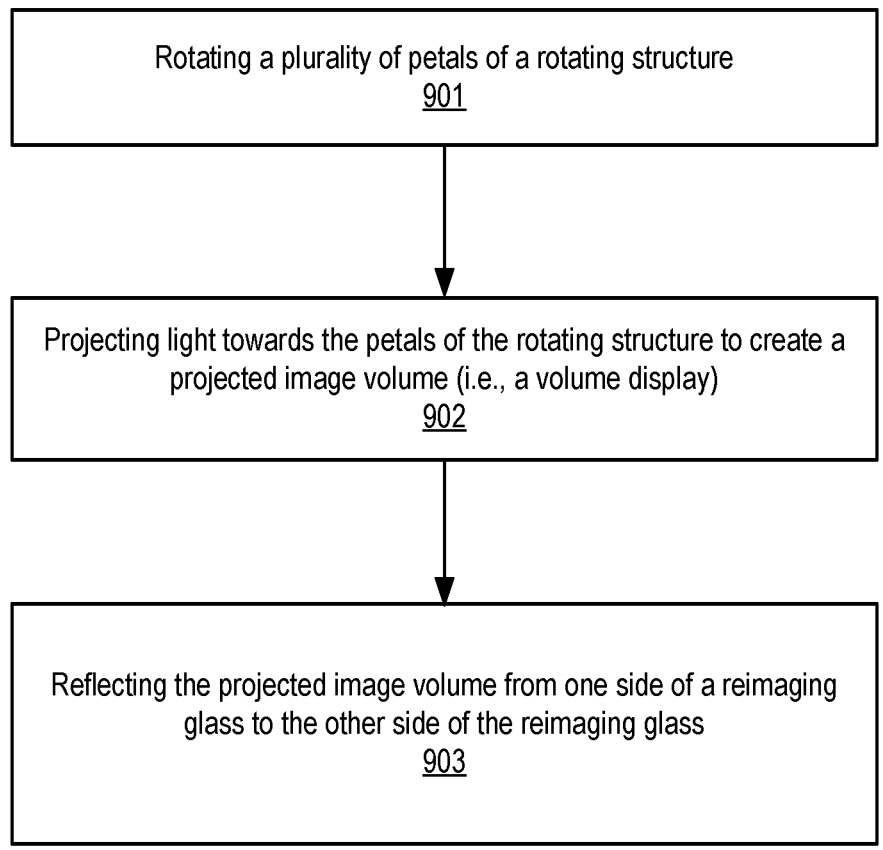
FIG. 9 is a flow diagram of one embodiment of a process for generating a reimaged object using a swept volume display and reimaging glass.

FIG. 9 is a flow diagram of one embodiment of a process for generating a reimaged object using a swept volume display and reimaging glass. In one embodiment, the process is performed by processing logic that may comprise hardware (e.g., circuitry, dedicated logic, etc.), software (such as is run on a general purpose computer system or a dedicated machine), firmware, or a combination of the three.

Referring to FIG. 9, the process begins by rotating the plurality of petals of a rotating structure (processing block 901). In one embodiment, the plurality of the petals are spun at 45 degrees to render the projected image volume. In one embodiment, the plurality of petals comprises four petals configured to be at 45 degrees away from the viewer.

While rotating the plurality of petals, projecting light towards the rotating structure from beneath the plurality of petals to create a projected image volume (i.e., a volume display) using a swept volume display (processing block 902). That is, the projected image volume is rendered by spinning the petals when light is being projected on the plurality of petals.

Then, the process reflects the projected image volume from a first side of a re-imaging glass to a second side of the re-imaging glass (processing block 903).

Figure 10:
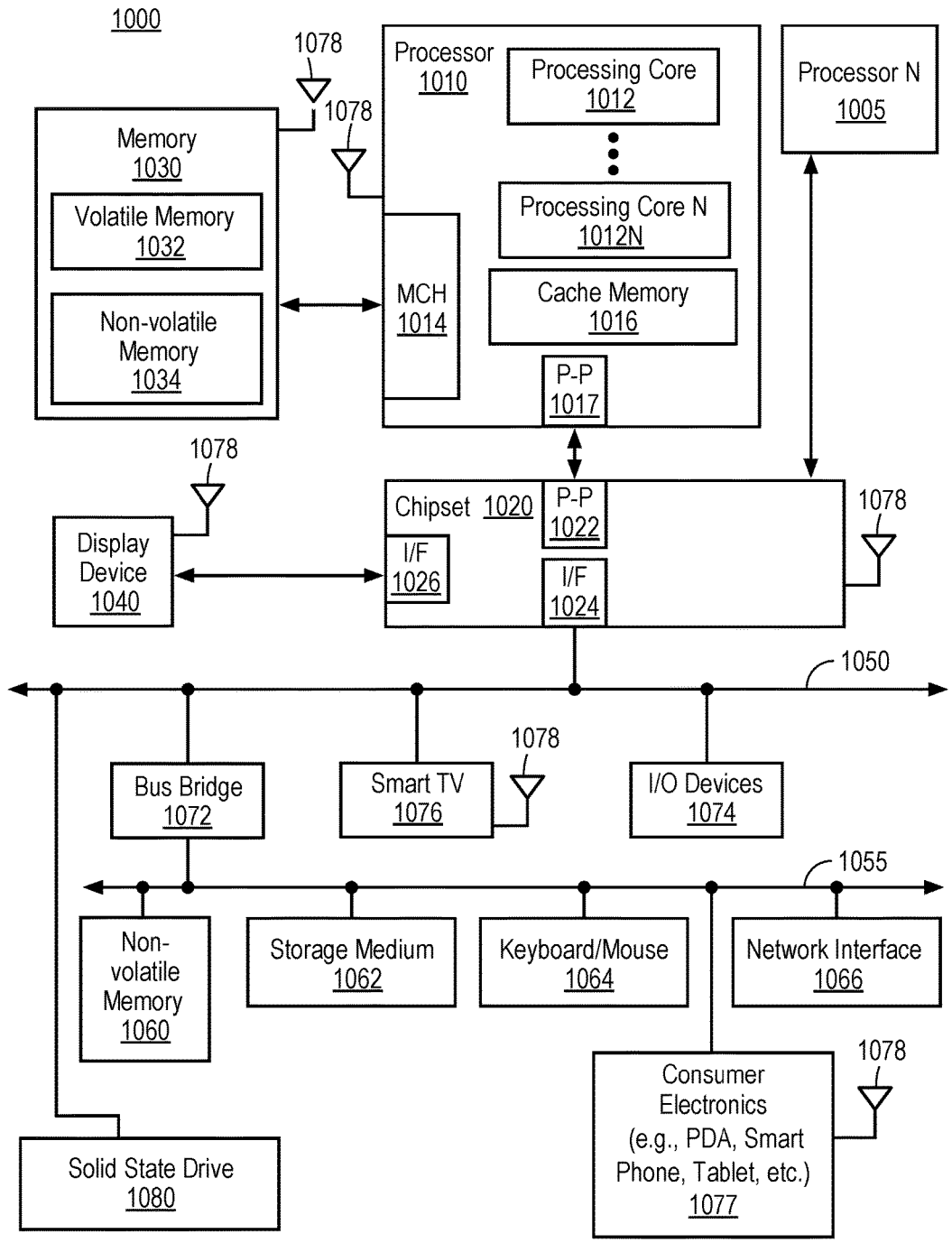
FIG. 10 is one embodiment of a system level diagram.

FIG. 10 is one embodiment of a system level diagram 1000 that may incorporate the techniques described above and control the display system described above. For example, the techniques described above may be used in conjunction with a processor in system 1000 or other part of system 1000.

Referring to FIG. 10, system 1000 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device.

In one embodiment, processor 1010 has one or more processor cores 1012 to 1012N, where 1012N represents the Nth processor core inside the processor 1010 where N is a positive integer. In one embodiment, system 1000 includes multiple processors including processors 1010 and 1005, where processor 1005 has logic similar or identical to logic of processor 1010. In one embodiment, system 1000 includes multiple processors including processors 1010 and 1005 such that processor 1005 has logic that is completely independent from the logic of processor 1010. In such an embodiment, a multi-package system 1000 is a heterogeneous multi-package system because the processors 1005 and 1010 have different logic units. In one embodiment, processing core 1012 includes, but is not limited to, pre-fetch logic to fetch instructions, decode logic to decode the instructions, execution logic to execute instructions and the like. In one embodiment, processor 1010 has a cache memory 1016 to cache instructions and/or data of the system 1000. In another embodiment of the invention, cache memory 1016 includes level one, level two and level three, cache memory, or any other configuration of the cache memory within processor 1010.

In one embodiment, processor 1010 includes a memory control hub (MCH) 1014, which is operable to perform functions that enable processor 1010 to access and communicate with a memory 1030 that includes a volatile memory 1032 and/or a non-volatile memory 1034. In one embodiment, memory control hub (MCH) 1014 is positioned outside of processor 1010 as an independent integrated circuit.

In one embodiment, processor 1010 is operable to communicate with memory 1030 and a chipset 1020. In such an embodiment, SSD 1080 executes the computer-executable instructions when SSD 1080 is powered up.

In one embodiment, processor 1010 is also coupled to a wireless antenna 1078 to communicate with any device configured to transmit and/or receive wireless signals. In one embodiment, wireless antenna interface 1078 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 1032 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1034 includes, but is not limited to, flash memory (e.g., NAND, NOR), phase change memory (PCM), read-only memory (ROM), electrically erasable programmable read-only memory (EEPROM), or any other type of non-volatile memory device.

Memory 1030 stores information and instructions to be executed by processor 1010. In one embodiment, chipset 1020 connects with processor 1010 via Point-to-Point (PtP or P-P) interfaces 1017 and 1022. In one embodiment, chipset 1020 enables processor 1010 to connect to other modules in the system 1000. In one embodiment, interfaces 1017 and 1022 operate in accordance with a PtP communication protocol such as the Intel QuickPath Interconnect (QPI) or the like.

In one embodiment, chipset 1020 is operable to communicate with processor 1010, 1005, display device 1040, and other devices 1072, 1076, 1074, 1060, 1062, 1064, 1066, 1077, etc. In one embodiment, chipset 1020 is also coupled to a wireless antenna 1078 to communicate with any device configured to transmit and/or receive wireless signals.

In one embodiment, chipset 1020 connects to a display device 1040 via an interface 1026. In one embodiment, display device 1040 includes, but is not limited to, liquid crystal display (LCD), plasma, cathode ray tube (CRT) display, or any other form of visual display device. In addition, chipset 1020 connects to one or more buses 1050 and 1055 that interconnect various modules 1074, 1060, 1062, 1064, and 1066. In one embodiment, buses 1050 and 1055 may be interconnected together via a bus bridge 1072 if there is a mismatch in bus speed or communication protocol. In one embodiment, chipset 1020 couples with, but is not limited to, a non-volatile memory 1060, a mass storage device(s) 1062, a keyboard/mouse 1064, and a network interface 1066 via interface 1024, smart TV 1076, consumer electronics 1077, etc.

In one embodiment, mass storage device 1062 includes, but is not limited to, a solid state drive, a hard disk drive, a universal serial bus flash memory drive, or any other form of computer data storage medium. In one embodiment, network interface 1066 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 10 are depicted as separate blocks within the system 1000, the functions performed by some of these blocks may be integrated within a single semiconductor circuit or may be implemented using two or more separate integrated circuits.

In one example embodiment, a display system comprises a swept volume display operable to produce a displayed swept volume and a re-imaging glass to re-image the displayed swept volume that appears on a first side of the re-imaging glass to a second side of the re-imaging glass.

In another example embodiment, the subject matter of the first example embodiment can optionally include that the swept volume display comprises a rotating structure having a plurality of petals, and a projector to project light towards the rotating structure from beneath the plurality of petals, the rotating structure being operable to render the displayed swept volume by spinning the petals when light is being projected on the plurality of petals by the projector. In another example embodiment, the subject matter of this example embodiment can optionally include that the rotating structure is operable to spin the petals at 45 degrees to render the displayed swept volume.

In another example embodiment, the subject matter of the first example embodiment can optionally include that the displayed swept volume is positioned at 45 degree angles behind the reimaging glass.

In another example embodiment, the subject matter of the first example embodiment can optionally include that the plurality of petals comprises four petals. In another example embodiment, the subject matter of this example embodiment can optionally include that the petals are configured to be at 45 degrees away from the viewer.

In another example embodiment, the subject matter of the first example embodiment can optionally include a rotary encoder coupled to the plurality of petals.

In another example embodiment, the subject matter of the first example embodiment can optionally include that the projector comprises a condenser lens and an integration rod.

In another example embodiment, the subject matter of the first example embodiment can optionally include that the rotating structure causes a volume to sweep an area that is reimaged by the re-imaging glass at the correct angle to preserve light rays along the X axis and the Y axis, and the re-imaged displayed swept volume appears at a first distance in front of the re-imaging glass equal to a second distance as the real volume is rendered on the petals.

In another example embodiment, the subject matter of the first example embodiment can optionally include that the re-imaging glass comprises Asukanet glass.

In a second example embodiment, a display system comprising a projector operable to project light, a rotating structure having a plurality of petals operable to produce a volume display by spinning the petals when light is being projected on the plurality of petals by the projector, and a re-imaging glass to re-image the volume display that appears on a first side of the re-imaging glass to a second side of the re-imaging glass.

In another example embodiment, the subject matter of the second example embodiment can optionally include that the rotating structure is operable to spin the petals at 45 degrees to render the volume display.

In another example embodiment, the subject matter of the second example embodiment can optionally include that the volume display is positioned at 45 degree angles behind the reimaging glass.

In another example embodiment, the subject matter of the second example embodiment can optionally include that the plurality of petals comprises four petals. In another example embodiment, the subject matter of this example embodiment can optionally include that the petals are configured to be at 45 degrees away from the viewer.

In another example embodiment, the subject matter of the second example embodiment can optionally include a rotary encoder coupled to the plurality of petals.

In another example embodiment, the subject matter of the second example embodiment can optionally include that the projector comprises a condenser lens and an integration rod.

In another example embodiment, the subject matter of the second example embodiment can optionally include that the rotating structure causes a volume to sweep an area that is reimaged by the re-imaging glass at the correct angle to preserve light rays along the X axis and the Y axis, and wherein the re-imaged volume display appears at a first distance in front of the re-imaging glass equal to a second distance as the real volume is rendered on the petals.

In another example embodiment, the subject matter of the second example embodiment can optionally include that the re-imaging glass comprises Asukanet glass.

In another example embodiment, the subject matter of the second example embodiment can optionally include a 2D display touchscreen coupled to the volume display.

In another example embodiment, the subject matter of the second example embodiment can optionally include that the volume display is a volumetric aerial image.

In a third example embodiment, a method comprises creating a projected image volume using a swept volume display and creating a re-imaged volume by reflecting the projected image volume from a first side of a re-imaging glass to a second side of the re-imaging glass.

In another example embodiment, the subject matter of the third example embodiment can optionally include rotating the plurality of petals and projecting light towards the rotating structure from beneath the plurality of petals, wherein the projected image volume is rendered by spinning the petals when light is being projected on the plurality of petals. In another example embodiment, the subject matter of this example embodiment can optionally include that the plurality of the petals are spun at 45 degrees to render the projected image volume.

In another example embodiment, the subject matter of the second example embodiment can optionally include that the plurality of petals are configured to be at 45 degrees away from the viewer.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A display system comprising:
a swept volume display operable to produce a displayed swept volume, wherein the swept volume display comprises
a rotating structure having a plurality of petals, and
a projector to project light towards the rotating structure from beneath the plurality of petals, the rotating structure being operable to render the displayed swept volume by spinning the petals when light is being projected on the plurality of petals by the projector; and
a re-imaging glass to re-image the displayed swept volume that appears on a first side of the re-imaging glass to a second side of the re-imaging glass where a user is able to have direct interaction with the displayed swept volume, wherein the displayed swept volume is positioned at 45 degree angle behind and away from the reimaging glass and above a midpoint of the reimaging glass.

2. The display system defined in claim 1 wherein the rotating structure is operable to spin the petals at 45 degrees to render the displayed swept volume.

3. The display system defined in claim 1 wherein the plurality of petals comprises four petals.

4. The display system defined in claim 3 wherein the plurality of petals are configured to be at 45 degrees away from the viewer.

5. The display system defined in claim 1 further comprising a rotary encoder coupled to the plurality of petals.

6. The display system defined in claim 1 wherein the projector comprises a condenser lens and an integration rod.

7. The display system defined in claim 1 wherein the rotating structure causes a volume to sweep an area that is reimaged by the re-imaging glass at a correct angle to preserve light rays along an X axis and a Y axis, and wherein the re-imaged displayed swept volume appears at a first distance in front of the re-imaging glass equal to a second distance as a real volume is rendered on the petals.

8. The display system defined in claim 1 wherein the re-imaging glass comprises Asukanet glass.

9. A display system comprising:
a projector operable to project light;
a rotating structure having a plurality of petals operable to produce a volume display by spinning the petals when light is being projected on the plurality of petals by the projector from beneath the plurality of petals; and
a re-imaging glass to re-image the volume display that appears on a first side of the re-imaging glass to a second side of the re-imaging glass where a user is able to have direct interaction with the displayed swept volume, wherein the displayed swept volume is positioned at 45 degree angle behind and away from the reimaging glass and above a midpoint of the reimaging glass.

10. The display system defined in claim 9 wherein the rotating structure is operable to spin the petals at 45 degrees to render the volume display.

11. The display system defined in claim 9 wherein the plurality of petals comprises four petals.

12. The display system defined in claim 11 wherein the plurality of petals are configured to be at 45 degrees away from the viewer.

13. The display system defined in claim 9 further comprising a rotary encoder coupled to the plurality of petals.

14. The display system defined in claim 9 wherein the projector comprises a condenser lens and an integration rod.

15. The display system defined in claim 9 wherein the rotating structure causes a volume to sweep an area that is reimaged by the re-imaging glass at a correct angle to preserve light rays along an X axis and a Y axis, and wherein the re-imaged volume display appears at a first distance in front of the re-imaging glass equal to a second distance as a real volume is rendered on the petals.

16. The display system defined in claim 9 wherein the re-imaging glass comprises Asukanet glass.

17. The display system defined in claim 9 further comprising a 2D display touchscreen coupled to the volume display.

18. The display system defined in claim 9 wherein the volume display is a volumetric aerial image.

19. A method comprising:
creating a projected image volume using a swept volume display, wherein the swept volume display comprises
a rotating structure having a plurality of petals, and
a projector to project light towards the rotating structure from beneath the plurality of petals, the rotating structure being operable to render the displayed swept volume by spinning the petals when light is being projected on the plurality of petals by the projector; and
creating a re-imaged volume by reflecting the projected image volume from a first side of a re-imaging glass to a second side of the re-imaging glass where a user is able to have direct interaction with the displayed swept volume, wherein the displayed swept volume is positioned at 45 degree angle behind and away from the reimaging glass and above a midpoint of the reimaging glass.

20. The method defined in claim 19 further comprising:
rotating a plurality of petals; and
projecting light towards a rotating structure from beneath the plurality of petals, wherein the projected image volume is rendered by spinning the petals when light is being projected on the plurality of petals.

21. The method defined in claim 20 wherein the plurality of the petals are spun at 45 degrees to render the projected image volume.

22. The method defined in claim 20 wherein the plurality of petals are configured to be at 45 degrees away from the viewer.

* * * * *